United States Patent Office 3,076,787
Patented Feb. 5, 1963

3,076,787
UNSATURATED RESIN COMPOSITIONS SUITABLE FOR MAKING SELF-SUPPORTING FILM BASED ON $C_8$–$C_{20}$ ALKENYL SUCCINIC ACID
Gordon B. Johnson, Sausalito, and Henry Y. Lew, El Cerrito, Calif., assignors to California Research Corporation, San Francisco, Calif., a corporation of Delaware
No Drawing. Filed Mar. 24, 1961, Ser. No. 98,016
8 Claims. (Cl. 260—75)

The present invention relates to the preparation of novel unsaturated polyesters, and to said unsaturated polyesters modified to produce flexible, tough compositions, including compositions having excellent film properties, such as good tensile strength, tear resistances and dimensional stability, low water absorption, and the like. These materials are useful as packaging films, membranes, flexible coatings, table cloths, shower curtains, and the like.

Polyester resinous compositions prepared by the esterification of a glycol, such as ethylene glycol, with an unsaturated dicarboxylic acid or anhydride, such as maleic acid or maleic anhydride, in which a portion of the said acid or anhydride is replaced with a phthalic acid or phthalic anhydride are known. It is also known to modify said resinous compositions by copolymerization with a compound containing the group $CH_2=C<$, such as styrene. In effecting the copolymerization, a polymerization catalyst, such as benzoyl or lauroyl peroxide or methylethylketone peroxide or tertiary butyl peroxide, with or without an accelerator such as cobalt naphthenate or a tertiary amine compound, is employed. The temperatures of copolymerization can vary from 20° C. to 150° C., depending on the catalyst employed. Curing of the mixture can be started at room temperature and completed at higher temperature.

Unsaturated polyesters are generally regarded as non-film forming agents, useful, for example, in the preparation of structural laminates and rigid molded materials; as film-forming materials, they do not presently offer any serious competition to such conventional film-forming materials as polyvinyl chloride, polyethylene and cellophane.

Physical properties which are most important for film applications are tensile strength, elongation, tear resistance, water absorption, and clarity. An ideal film material, particularly for packaging use, should be low-cost, and have high tensile strength and tear resistance for film strength, high clarity for appearance, low elongation for film rigidity, and low water absorption for resistance to moisture. No material found to date has all these properties. In actual practice, low-cost materials with good film strength but some tolerated deficiencies are used for film application. Unless these deficiencies are corrected by further processing, these materials have limited uses. Such is the case with cellophane; it has high water absorption and is thus sensitive to moisture; it is made moisture-proof by coating with a lacquer or only used uncoated for general wrapping purposes, where moisture protection is not needed. However, further processing is undesirable since it adds to the cost of the film material. In order to determine what general properties and minimum film strengths are required for film application, reference is made to the properties of the two largest-volume commercial films, namely, cellophane and polyethylene. Cellophane has 4,400–18,600 p.s.i. tensile strength, 15–45% elongation, 110–515 lb./in. tear resistance, very good clarity, and 45–115% water-absorption, while polyethylene has 1350–2500 p.s.i. tensile strength, 50–600% elongation, 65–575 lb./in. tear resistance, 0–0.8% water-absorption, and poor clarity.[1]

As mentioned above, the main deficiency of cellophane is its high water-absorption, whereas the main deficiencies of polyethylene are its lower tensile strength, higher elongation and poor clarity. A film with the clarity of cellophane and the low water-absorption of polyethylene and tensile strength, elongation and tear resistance intermediate between the two would be particularly useful in application where neither cellophane nor polyethylene is suitable—such as for packaging of cigarettes, candy and bread where moisture-proofness and clarity are essential. Films prepared in accordance with this invention have these properties.

Now, in accordance with the present invention, flexible resinous compositions can be prepared from copolymerizable mixtures of a monomer containing the polymerizable group $CH_2=C<$ and an unsaturated polyester of the maleic acid-glycol type specially modified. The unsaturated polyester component of the mixture which is later to be admixed with the copolymerizable monomer and then cured is obtained by the condensation of a glycol such as diethylene glycol and an ethylenically unsaturated aliphatic dibasic acid, such as maleic acid, part of which is replaced not only with a phthalic acid or phthalic anhydride but also with an alkenyl succinic acid. The alkenyl succinic acid component of the compositions herein contemplated may be represented by the formula

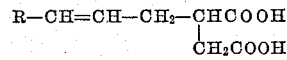

wherein R is an alkyl group of 5 to 17 or more carbon atoms.

In carrying out the invention, the proportions of the ethylenically unsaturated dibasic acid in forming the unsaturated polyester component can vary from about 0.1 to 2 mol, preferably 0.2 to 1.0 mol for each mol of combined phthalic acid or phthalic anhydride and alkenyl succinic acid. The alkenyl succinic acid, on the other hand, can vary from about 0.1 to 0.3 mol for each mol of combined phthalic acid or phthalic anhydride and alkenyl succinic acid.

While alkenyl succinic acid has been exemplified above, its anhydride can also be used. Alkenyl succinic acid or its anhydride can be prepared in known fashion, as shown for example in U.S. Patent No. 2,360,426. The preparation involves the thermal 1:1 condensation of a straight or branched chain 1-olefin and maleic anhydride. Conveniently, 1-olefins which may be used in this reaction are readily obtained by the cracking of petroleum waxes or distillates. The olefin used may be a single species, such as 1-octene or a mixture of olefins having 8 to 20 carbon atoms in the molecule.

In the preparation of the flexible compositions of the invention, conventional principles are followed as shown for example in U.S. Patent No. 2,904,533. Glycol, for example diethylene glycol, alkenyl succinic acid or alkenyl succinic anhydride, and phthalic anhydride or a phthalic acid, such as isophthalic acid or terephthalic acid, are heated to reaction temperatures. Esters of the phthalic acid and low molecular weight alcohols, such as dimethyl isophthalate and dimethyl terephthalate, can also be employed.

Reaction temperatures are sufficiently high to expel water or methyl alcohol from the system. When isophthalic acid or phthalic anhydride is employed, reaction is continued to a low acid number of below 30, and preferably below 25. When the ester of the phthalic acid with a lower boiling alcohol, such as methyl alcohol, is employed, reaction is continued until about 95% of the ---
[1] Modern Plastics Encyclopedia, 1958.

theoretical amount of methyl alcohol is removed. The reaction is advantageously conducted under an inert atmosphere, for example, nitrogen or carbon dioxide. In the esterification of the acid material with the glycol, temperatures of the order of 370° F. to 450° F. and reaction times of 6 to 8 hours are usual; generally the longer the cooking time the greater the polyesterification and, hence, the higher molecular weight of the ester.

Upon completion of the esterification reaction, as evidenced by low acid number or the cessation of water or methyl alcohol formation, the unsaturated aliphatic dibasic acid or acid anhydride, for example, maleic acid, maleic anhydride or fumaric acid, is added in appropriate amount and caused to react with the esterification product of phthalic acid or phthalic anhydride, alkenyl succinic acid and glycol. This reaction is also preferably carried out in an inert atmosphere at temperatures usually of the order of 400° F. to 450° F. for a period of time ranging from about 10 hours to 12 hours. The finished resin, having an acid number below about 30, a calculated molecular weight between 1000 and 4000, preferably 2000 to 3000, and a Gardner-Holdt viscosity of F or greater in a 60% polyester–40% toluene solution, is then mixed with the desired proportion of copolymerizing monomer, for example, styrene. Above 150° F. the polyesters are sufficiently fluid to be readily mixed with the monomer.

In carrying out the reaction as above described, the dihydric alcohol, or glycol, is usually employed in stoichiometric excess over combined acid ingredients, a stoichiometric excess up to 5 mol percent being typical.

As is also known in the art, in place of diethylene glycol, other glycol material can be employed. Examples of glycols include ethylene glycol, triethylene glycol, 1,2-propylene glycol, 1,2- or 1,3-dipropylene glycol, 1,3-propylene glycol, 1,3-butyleneglycol, 1,2-butylene glycol, 1,4-butane diol, neopentyl glycol, 1,3-pentane diol, and 1,5-pentane diol.

In place of maleic acid, maleic anhydride or fumaric acid, other suitable ethylenically unsaturated dicarboxylic acids, including $\alpha,\beta$-ethylenically unsaturated dibasic acids can be used. Examples of such acids are itaconic, mesaconic, citraconic, ethyl maleic, and dichloro maleic acids.

The unsaturated polyesters obtained as above described are then admixed with a copolymerizing compound containing the polymerizable group $CH_2=C<$ bond, such as styrene. In general, satisfactory amounts of the copolymerizing monomer range from 30 to 60%, and the unsaturated polyester from 40 to 70% by weight.

Examples of solubilizing monomers in addition to the preferred styrene are other aryl mono-olefins, such as ring-substituted styrenes, for example, mono- and poly-alkyl styrenes, mono- and polychlorostyrenes, in which the alkyl and chlorine radicals are substituted on the ring, etc. Other type vinyl compounds are vinyl esters, ketones and ethers; vinylidene halides; acrylic and methacrylic acids and their derivatives, e.g., amides, esters and nitriles. Diallyl esters of a saturated or aromatic dibasic acid and the substituted allyl esters, for example diethallyl and dimethallyl esters, are also suitable, specific samples being diallyl phthalate, diallyl adipate, sebacate, glutarate, etc.

At the mixing stage, an inhibitor such as hydroquinone or tertiary butyl catechol, is advantageously added to the unsaturated polyester to stabilize the resin and prevent premature gelation or cross-linking. If desired, the stabilizer may be added at a prior time, namely, during the preparation of the unsaturated polyester.

As hereinabove indicated, in carrying out the polymerization of the polymerizable monomer and unsaturated polyester, a catalyst is employed. Suitable catalysts are peroxidic materials, such as benzoyl peroxide, methylethylketone peroxide, cyclohexanone peroxide, cumene hydroperoxide and the like. These can be employed in the customary amounts of 0.2% to 5.0%, based on the resin-monomer solution. In addition, certain tertiary amines, such as dimethylanaline diethylanaline, and N-ethyl-metatoluidine and/or cobalt naphthanate as a promoter for the above initiators are used in amounts of 0.01% to 2% by weight based on resin-monomer solution.

In order more fully to illustrate the practice of the invention, the following examples are given. In the examples, the glycol material was employed in a stoichiometric excess of 2 to 5 mol percent over combined phthalic acid, alkenyl succinic anhydride, and unsaturated aliphatic dibasic acid or acid anhydride.

The copolymerizing monomer in the preparation of the film was added to the polyester at a temperature of 70° F. to 250° F. and mixed thoroughly to give styrene-polyester solution of 60% polyester and 40% styrene. To 100 parts, by weight, of the styrene-polyester solution were added 0.5 part of Lupersol DDM (60% methylethylketone peroxide in dimethyl phthalate), 1 part Luperco ATC (benzoyl peroxide compounded with tricresyl phosphate, the peroxide assaying 50%), and 0.15 part of 6% cobalt naphthanate. The mixture and catalyst were well mixed, filtered through a cloth screen, degassed in a vacuum desiccator to remove air bubbles, and cast between two sheets of cellophane or mylar film separated by a metal spacer to control film thickness to 0.014–0.018 inch. The film was allowed to gel and then cured in an oven for 10–30 minutes at 250° F. to 300° F.

Films prepared in accordance with the examples have water absorptions below about 0.5% and tear resistances of the order of 200 to 350 lbs./in. and higher.

*Example 1*

Diethylene glycol, 46.2 parts; isophthalic acid, 38.8 parts; and 16.6 parts of octenyl succinic anhydride were charged to a reaction flask provided with a steam-jacketed distillation column for the separation of the glycol material from the water of reaction and to return the glycol material to the reaction vessel. The contents of the flask were blanketed with nitrogen and cooked at 430° F. to an acid number of 9.6. The reaction mixture was then cooled to 400° F. and fumaric acid, 12.0 parts, was added, and the whole further cooked at a temperature of 430° F. When 90–95% of the water of reaction was removed, the steam-jacketed distillation column was replaced by an air-cooled distillation column. The maximum pot temperature throughout the reaction was 430° F., and the maximum overhead temperature was 230° F. The reaction was continued until an acid number of 15 was reached, cooled to 400° F., and tertiary butyl catechol, 0.2 part, was added. The polyester, 60% in toluene, had a Gardner-Holdt viscosity of S. The film prepared from this resin had an ultimate tensile strength of 3850 p.s.i., and an ultimate elongation of 31%.

*Example 2*

Following the procedure of Example 1, an unsaturated polyester was made from 42.1 parts isophthalic acid, 45.2 parts diethylene glycol, 14.7 parts $C_{10}$–$C_{20}$ alkenyl succinic anhydride, and 11.8 parts fumaric acid. Final acid number of the polyester was 25.2. A solution of 60% of this polyester in styrene had a Gardner-Holdt viscosity of N. The film prepared from this material had an ultimate tensile strength of 4400 p.s.i. and an ultimate elongation of 28%.

*Example 3*

Isophthalic acid, 27.9 parts; octadecenyl succinic anhydride, 14.8 parts; diethylene glycol, 47.3 parts; and fumaric acid, 24.4 parts, were reacted as in Example 1. The polyester was cooked to a final acid number of 15.8. The Gardner-Holdt viscosity, 60% polyester in toluene, was H+. The film had an ultimate tensile strength of 7600 p.s.i. and an ultimate elongation of 5%.

Example 4

Following the procedure of Example 1, an unsaturated polyester was prepared from 39.5 parts isophthalic acid, 15.8 parts tetrapropenyl succinic anhydride, 50.7 parts dipropylene glycol, and 5.8 parts maleic anhydride. The unsaturated polyester was cooked to an acid number of 15.6. The Gardner-Holdt viscosity, 60% polyester in toluene, was F. A film prepared from this resin had an ultimate tensile strength of 5600 p.s.i. and an ultimate elongation of 6%.

Example 5

An unsaturated polyester suitable for film preparation was obtained in accordance with the procedure of Example 1, from isophthalic acid, 39.6 parts, octadecenyl succinic anhydride, 10.0 parts, ethylene glycol, 37.8 parts, and fumaric acid, 33.3 parts. The polyester was cooked to a final acid number of 1. The viscosity (60% polyester in ethyl Cellosolve) on the Gardner-Holdt scale was R.

As has been shown, tough, flexible compositions, including flexible films, having satisfactory film properties can be prepared economically from modified unsaturated polyesters. The compositions prepared in accordance with the invention, moreover, possess certain superior properties over conventional films. For example, the materials of the invention are thermosetting, that is, have no melting points, as opposed to polyethylene films which are thermoplastic in nature. Also, the compositions of the present invention do not require a plasticizer conventionally employed in the vinyl-type films, the loss of which in vinyl films causes embrittlement.

We claim:

1. An unsaturated polyester composition useful in the preparation of flexible films which is the condensation product of (1) an aliphatic ethylenically unsaturated dibasic acid reacting material selected from the group consisting of an α,β-ethylenically unsaturated dicarboxylic acid and its anhydride; (2) an aromatic acid-reacting material selected from the group consisting of isophthalic acid, terephthalic acid, orthophthalic acid and its anhydride, and esters thereof with lower molecular weight alcohols; (3) a member of the group consisting of alkenyl succinic acid and its anhydride having 8 to 20 carbon atoms in the alkenyl group; and (4) an aliphatic saturated dihydric alcohol; the aliphatic ethylenically unsaturated acid being present in proportions of 0.1 to 1 mol per mol of combined (2) and (3), and (3) being employed in proportions of 0.1 to 0.3 mol per mol of (2) and (3), said unsaturated polyester having an acid number below about 30.

2. Composition according to claim 1, wherein the dihydric alcohol is employed in a stoichiometric excess up to about 5 mol percent of combined (1), (2) and (3).

3. Composition according to claim 2, wherein the α,β-ethylenically unsaturated dicarboxylic acid-reacting material is maleic anhydride.

4. Composition according to claim 2, wherein the ethylenically unsaturated dicarboxylic acid-reacting material is fumaric acid.

5. Composition according to claim 2, wherein the aromatic acid-reacting material is phthalic anhydride.

6. Composition according to claim 2, wherein the aromatic acid-reacting material is isophthalic acid.

7. Composition according to claim 2, wherein the dihydric alcohol is selected from the group consisting of diethylene glycol, ethylene glycol and dipropylene glycol.

8. Composition according to claim 3, wherein the aromatic acid-reacting material is isophthalic acid and the dihydric alcohol is diethylene glycol.

References Cited in the file of this patent

UNITED STATES PATENTS

| | | |
|---|---|---|
| 2,562,878 | Blair | Aug. 7, 1951 |
| 2,957,837 | Smith | Oct. 25, 1956 |

FOREIGN PATENTS

| | | |
|---|---|---|
| 665,595 | Great Britain | Jan. 23, 1952 |